Patented Sept. 28, 1943

2,330,553

UNITED STATES PATENT OFFICE 2,330,553

FERRIC OXIDE AND ITS PREPARATION

Benjamin F. Butler, New York, N. Y.

No Drawing. Application December 17, 1938,
Serial No. 246,381

4 Claims. (Cl. 23—200)

This invention relates to the art of preparing ferric oxide, particularly to an exceedingly rapid exothermic oxidation-reduction process, and to the resulting products.

The process of this invention employs metallic iron which is oxidized to ferric oxide, and nitric acid which is reduced to oxides of nitrogen. The process contemplates reactions between metallic iron and nitric acid in which the nitric acid is decomposed to oxides of nitrogen and the metallic iron is converted to ferric oxide.

Heretofore it has been thought that strong nitric acid renders metallic iron passive to further action by the acid, by forming on the iron a thin coating of oxygen or oxide. According to the present invention, however, metallic iron is made to react with nitric acid, in quantity less than sufficient to convert all the iron to ferric nitrate, and thus to form iron oxide.

The oxides of nitrogen which are liberated in the process of this invention may be reconverted to nitric acid by methods well known in the art of manufacturing nitric acid, and the recovered acid may be returned to react with more iron. In this cyclic manner, in which the nitric acid is decomposed, regenerated, and returned to react with more metallic iron, a relatively small quantity of nitric acid may be used to convert large quantities of metallic iron to ferric oxide, and the nitric acid acts somewhat as a catalyzer or oxygen carrier. The catalytic nature of the reaction is due to the repeated reduction of the nitric acid to oxides of nitrogen, and the reoxidation of the oxides of nitrogen to nitric acid.

It appears that the process of this invention is a corrosion process, but the rate of corrosion, the manner in which corrosion occurs, and the products of corrosion distinguish it and set it apart from other forms of corrosion and constitute a contribution to the art of preparing metallic oxides by the corrosion of a metal. This process is one of corrosion in a medium in which corrosion of iron has been previously believed to be retarded by the passivity caused by this very medium.

As an example of the simplicity of the process, I may form ferric oxide by merely adding iron in somewhat subdivided state, such as iron borings, to nitric acid; thus, 10 grams of iron borings added to 10 cc. of commercial concentrated 36° Baumé nitric acid will cause iron oxide to form so rapidly that in a few moments time a brown muddy sludge results, from which the oxide is recovered as desired.

Similar results are obtained with less concentrated acid; thus, 10 grams of iron borings added to a solution consisting of 10 cc. of concentrated nitric acid and 10 cc. of water will likewise cause iron oxide to form at such a rate that a muddy brown sludge results in a few moments time.

Another way in which I may prepare ferric oxide is by adding 1 part by weight of iron borings to 2 parts by weight of a solution prepared by diluting concentrated nitric acid with an equal volume of water.

The foregoing examples illustrate how metallic iron may be added to a solution of nitric acid and be thereby oxidized to ferric oxide. Such procedure is by no means the most efficient way of producing oxide, as it entails the use of a large excess of metallic iron. This may be recovered by diluting the sludge and settling out iron and impurities such as silica, while recovering the iron oxide by filtering, washing and drying.

The process may be carried out continuously by adding iron borings at a constant rate to a solution of nitric acid, for example, a solution having a specific gravity of 1.2. During this procedure one observes (1) the evolution of a colorless gas, followed shortly by (2) the evolution of brown fumes from the surface of the solution, following shortly thereafter by (3) the formation of ferric oxide. Considerable heat is evolved during these reactions.

The evolved gas contains oxides of nitrogen which may be led through an absorption system where they are reconverted to nitric acid, which is returned to the reaction vessel. The solution containing the ferric oxide suspension is flowed continuously from the reaction vessel and is filtered, the filtrate being returned to the vessel. The oxide is separated from the solid impurities by taking advantage of the differences in specific gravity, and the soluble impurities are removed by washing. The oxide may be dried by the application of heat.

Within the limits hereinafter defined, other ratios of borings to acid than those indicated may be employed provided that at least sufficient iron be added to cause ferric oxide to separate. Other concentrations of nitric acid may be employed than those indicated; these variations in quantities and concentrations still result in the conversion of iron to oxide but affect the rate of corrosion.

If one were to add 1 part by weight of iron borings to 10 parts by weight of a solution prepared by diluting concentrated nitric acid with an equal volume of water, a solution of ferric nitrate would result apparently without the formation of ferric oxide. I have noted, however, the formation of a slight amount of oxide with ratio of 1 part of borings to 4 parts of solution. On the other hand, as hereinbefore indicated, were 1 part of borings added to 2 parts of solution, the formation of oxide takes place rapidly. It will be seen, therefore, that it is very important to control the ratio of metallic iron to nitric acid solution, so that there is sufficient iron to form ferric oxide or insufficient nitric acid to convert all the iron to ferric nitrate. Generally, this is accomplished by using more than one part of iron to four of 1:1 nitric acid, by weight, or by using at least 1 part of iron to nitric acid in solution containing 2 parts of concentrated nitric acid by weight.

By the process of this invention I may obtain a very finely divided oxide, the particles of which are on the order of colloidal size. The dry oxide is voluminous in nature with an enormus surface per unit weight.

The characteristics of the oxide obtained by this process make it well adapted for use as a ferric oxide catalyst.

As a specific example of one method by which I prepare ferric oxide for the oxidation of hydrogen sulphide, I give the following: Two gallons of solution prepared from equal volumes of water and concentrated nitric acid is placed in a magnetized stainless steel reaction vessel. A small opening in the top of the vessel serves as an intake for air and for the feed of borings. The vessel is connected to a reflux condenser which in turn is connected to a small absorption tower over which wash water from the filter cake of ferric oxide is circulated. Iron borings are added at a constant rate, as for example a rate equivalent to one pound per hour. The reaction vessel is water cooled to maintain a temperature of approximately 70 to 80° C. When a sludge of sufficient consistency is formed, it is continuously filtered, and the filtrate containing ferric nitrate is returned to the vessel.

A small air pump at the exit of the tower serves to suck sufficient air through the opening in the vessel, through the condenser and tower to supply the necessary oxygen to convert the oxides of nitrogen to nitric acid. The wash water from the filter is partially circulated over the tower as noted above and is returned to the reaction vessel at a strength of 30% nitric acid. The remainder of the wash water is evaporated to a specific gravity of 1.2 and is returned to the vessel. The washed filter cake is repulped and the solid impurities are separated from the colloidal ferric oxide by differences in densities. Alkali is then added to the ferric oxide suspension until it coagulates and settles. It is then washed by decantation and is filtered and washed, and may then be dried at 100° C. or it may be used without further dewatering.

It is then advisable to add alkali to the oxide. Good results are obtained if sufficient alkali is added so that approximately 5% free alkali by weight is present in the dry oxide. The alkali may be lime, caustic soda, soda ash, or any combination of these. The oxide concentrate may then be mixed with an appropriate support material, such as wood shavings or some granular support. A splendid material is obtained by mixing with wood shavings in such proportions that the following approximate analysis is obtained:

|  | Per cent |
|---|---|
| Wood shavings | 35 |
| Ferric oxide | 35 |
| Alkali | 2 |
| Water | 28 |

This material has a high efficiency for removing hydrogen sulphide from illuminating gas.

To determine the efficiency of the oxide as a catalyst, numerous samples were subjected to the Kunberger test, a general description of which may be found in the Gas Chemists' Handbook. Briefly, a 10 gram sample of the oxide is placed in a reaction tube through which concentrated hydrogen sulphide is passed at a rate of exactly 1 cubic foot per hour. The tube is weighed before and after the test to determine the capacity of the material, and the activity is expressed in the number of seconds that the material allows no trace of hydrogen sulphide to pass through. Catalysts prepared by the process of this invention showed capacities well over 50% and activities over 400 seconds.

The process of this invention may be utilized to produce excellent iron oxide paint pigments. These may be procured by taking the second filter cake from the procedure above and drying at 100° C. The dry cake may then be pulverized and by calcining by methods well known in the art various shades of brown or red may be produced by heating to the appropriate temperature. These pigments are found to have exceptional tinting strength and hiding power.

From the applications enumerated above it is obvious that other products may be prepared; catalysts for various processes or polishing material for plate glass are typical examples of the numerous uses in which the product of this process may be utilized.

The process as noted above produces a ferric oxide. By merely heating or calcining, the oxide may be converted to crystalline ferric oxide.

Magnetic oxide of iron may be obtained by calcining the ferric oxide in a reducing atmosphere.

The ferric oxide may be reconverted to metallic iron by reduction methods well known in the art, and by this means a very pure form of metallic iron may be produced from ordinary iron borings as a raw material.

This application is a continuation in part of my copending application Serial No. 193,432, filed March 2, 1938.

What I claim is:

1. The cyclic process of making ferric oxide from nitric acid solutions which comprises decomposing the nitric acid by adding metallic iron thereto and thereby forming ferric nitrate and oxides of nitrogen and of iron, reconverting said oxides of nitrogen to nitric acid by reaction with water and oxygen and returning said nitric acid to the reaction chamber to react with more iron and separating and recovering the ferric oxide from the reaction mixture.

2. Process for the production of ferric oxide which comprises reacting metallic iron and nitric acid, thereby forming ferric nitrate, an oxide of nitrogen, and ferric oxide while maintaining metallic iron in contact with the reaction mixture, reconverting the oxide of nitrogen to nitric acid and restoring it to the reaction mixture, withdrawing ferric oxide and ferric nitrate from the reaction mixture, separating the ferric oxide and ferric nitrate and restoring the ferric nitrate to the reaction mixture.

3. Process for the production of ferric oxide which comprises continuously supplying metallic iron to a reaction mixture containing ferric nitrate, nitric acid and water, thereby forming ferric oxide and an oxide of nitrogen, continuously withdrawing the ferric oxide, together with ferric nitrate, from the reaction mixture, separating the ferric oxide and the ferric nitrate, returning the separated ferric nitrate to the reaction mixture and continuously withdrawing the oxide of nitrogen from the reaction mixture, reconverting it to nitric acid and returning the latter to the reaction mixture.

4. Process for the production of ferric oxide which comprises continuously reacting metallic iron with nitric acid, thereby forming ferric nitrate, an oxide of nitrogen and ferric oxide in the reaction mixture while maintaining metallic iron in contact with the reaction mixture, continuously withdrawing the oxide of nitrogen from the reaction mixture and converting it to nitric acid and returning the latter to the reaction mixture, withdrawing ferric oxide together with ferric nitrate from the reaction mixture, separating the withdrawn ferric oxide and ferric nitrate and returning the latter to the reaction mixture.

BENJAMIN F. BUTLER.